United States Patent Office 2,944,541
Patented July 12, 1960

2,944,541

PROCESS FOR STIMULATING CONCEPTION IN ANIMALS

Eduardo M. Sacchi and Herbert G. Luther, Terre Haute, Ind., assignors to Chas. Pfizer & Co., Inc., New York, N.Y., a corporation of Delaware No Drawing. Filed July 1, 1957, Ser. No. 668,856

8 Claims. (Cl. 128—1)

The present invention is concerned with a process for stimulating conception in animals and particularly in animals where difficulty in conceiving has been established. The process is concerned chiefly with animals whose reproductive physiology involves definite estrual cycles, such as cattle, horses, sheep, goats, dogs, and cats. In specific terms the process of the present invention comprises introducing into the uterus of such an animal at or near the time of insemination an antibiotic solution of relatively small volume, having a substantially neutral pH, and being substantially isotonic so as not to disrupt the uterine physiology nor immobilize the sperm.

The problem of conceiving is an age-old problem with a small but still important proportion of the female of the species of most animal populations. The reason for failure to conceive in such cases can sometimes be established as being due to any of a number of anatomical abnormalities or diagnosable infections. However, many cases remain where there is no apparent reason why the animal fails to conceive. It is thought that many of these cases are due to low-grade or chronic, subclinical, undiagnosable infections of the endometrium. This problem is particularly aggravated with the bovine species where the production of milk is the chief objective of conception and not the production of young. It has been estimated by dairy experts that each day a cow is "open" when it should otherwise be with calf costs the owner approximately one dollar. It is, therefore, very important to insure that the cow conceives and becomes pregnant as soon after breeding rest as possible. A problem also exists, although of somewhat less economic importance, with other species where the chief objective of conception is the production of young. This is particularly true, for instance, with horses, where it is desired to breed a specific mare and stud horse for the production of a superior offspring for such purposes as racing. A similar situation obtains with show animals such as dogs. It is true, however, that the major need is with dairy cattle where the production of milk is the objective.

Artificial insemination has been a great boon to the dairy industry. In 1957 it is estimated that approximately seven million cows will be artificially bred. Approximately 35% of the inseminated cows do not conceive by first insemination. These animals are called repeat breeders and have to be rebred a second, third, or fourth time, etc. In about 20% of the failures reasons for the failure can be established as being due to various anatomical abnormalities of the genital tract of the cow, abnormalities of ovulation, abnormalities of the ovum, abnormalities of the sperm employed, nutritional disturbances or deficiencies, or specific infections such as brucellosis, vibriosis, trichomoniasis, etc. Specific treatments are already available for a number of these causes.

There, however, remains the group comprising about 15% of the total number of cows which do not conceive but for which there is no apparent reason for failure and for which no treatment is available. It is theorized that this elusive 15% of the animals actually do conceive but due to unfavorable conditions in the uterus abort. At this early stage a miscarriage would go totally unrecognized due to the small size of the embryo. This condition is very likely due to subclinical, undiagnosed, and unrecognized infections by any of a number of microorganisms.

Since the advent of antibiotics, uterine tablets and douches have been extensively used between estrual cycles to reduce infections. These interventions have only been partially successful, however, because the animals readily become re-infected. To avoid this, it has been proposed to employ antimicrobial douches at the time of estrum. This, however, is fraught with many problems including mechanical removal of the sperm due to the flooding effect of the solution and due to the tendency of such solutions to disrupt the uterine physiology or to be spermocidal. It is an object of the present invention to provide a process for the sterilization of the uterus at the time of estrum when the semen is deposited therein. This object has been accomplished as a result of the present invention by the use of low level, antibiotic solutions, small in volume, isotonic to avoid interference with the uterine physiology, and which are compatible with the semen.

A great deal of success has been achieved by use of the unique procedure of the present invention. The success of this procedure hinges on two major factors. The first is to introduce the antibiotic solution at such a time that it is present in the uterus providing its sterilizing effect at the moment when the motile sperm is present. The effect appears to be a predisposition of the uterine wall to attachment of the fertilized ovum thus promoting a successful pregnancy. Prior art methods which have failed to solve the problem have all involved the use of various types of douche solutions during estrual cycles but not at time of heat and these techniques have specifically avoided therapy at the time of insemination since a disruption of the uterine physiology or motility of the sperm has resulted. As already indicated, antimicrobial therapy at these periods has not solved the problem of repeat breeders.

Second, in addition to administering the antimicrobial solution at the proper time, the use of a solution meeting certain specific criteria is necessary. These criteria are that the solution be substantially neutral, preferably in the pH range 6.3–6.8, substantially isotonic so as not to disrupt the uterine physiology, and it must also be spermocompatible. This term is used as the opposite to spermocidal; that is, the motility of the sperm is not substantially hindered by the antibiotic solution. Finally, the solution must have adequate antimicrobial activity to achieve the desired antimicrobial or sterilizing effect, and it must be small in volume to avoid mechanical removal of the sperm from the uterus or prevent mechanical contact of the sperm with the ovum. More specifically, the volume of solution should be just sufficient to wet the endometrium of the uterus without providing pools of the solution therein. In bovine insemination a volume of about 8 to 10 ml. has been found satisfactory. A somewhat larger volume may be employed, up to about 15 ml. but it is preferred not to exceed approximately 10 ml. With smaller animals such as dogs, sheep, or goats, a proportionately smaller volume of solution should be employed. This can be roughly adjusted using the approximate weight of the animal's uterus as a guide but in no case, however, should a volume of less than about 2 ml. be employed. A minimum of experimentation is required to determine the optimum volume of solution to be employed with a given animal. Thus, with dogs, for instance, approximately 2 ml. of the antibiotic solution is employed. An animal of intermediate size, such as a hog or a small species of horse, requires a volume of approximately 5 to 7 ml. and, as already mentioned, a large animal, such as a cow, weighing about 1000 pounds requires approximately 10 ml.

Any of a number of the common antimicrobial agents available can be employed in the present process including both the antibiotics and other types of antimicrobial agents such as the synthetic types including the sulfa drugs. Specifically, it is preferred to employ a broad spectrum antibiotic and, preferably, a tetracycline antibiotic. This is due to the fact that the broad antimicrobial activity of these substances gives a greater assurance of effectiveness and further a number of pharmaceutical compositions meeting the above criteria can be prepared. Other antibiotics or combinations thereof, such as penicillin, streptomycin, carbomycin, polymyxin B, oleandomycin, fungicidin, neomycin, novobiocin, etc., may be employed. However, problems may exist in the pharmaceutical compounding of some of these antibiotics into solutions fulfilling the above criteria. Specific formulations are presented hereinafter illustrating the use of some of these antibiotics.

In general, if the antibiotic used is a salt-forming compound (acid or base), it is preferred to use a water soluble salt with a non-toxic acid or base or a combination of such salts. Thus, the sulfates of streptomycin, dihydrostreptomycin, polymyxin, neomycin, carbomycin, etc. are quite useful. This is also true of the hydrochlorides. These salts may be adjusted to the desired pH range without difficulty. Various buffers that are physiologically acceptable may be used in the present formulations. This includes such materials as citrates, acetates, phosphates, tartrates, and so forth. Those antibiotics that possess low aqueous solubility in the preferred pH range may be solubilized by methods adequately described in the prior art. It must, of course, be remembered that the solutions for the present use must be substantially isotonic, so that in adding antibiotic salts, and in adjusting the pH or buffering the preparations, caution must be used. If the solutions are hypotonic, they may be adjusted by addition of a water soluble, non-toxic salt such as sodium chloride or a non-toxic, non-electrolyte such as glucose.

The selection of compositions for use in the present procedure is done in a relatively straightforward manner. First of all, it is preferred to employ a solution as opposed to a suspension since this minimizes the mechanical difficulties of administration, and insures thorough contact with the endometrium. Certain suspensions are, however, operable. Second, the osmotic pressure of the solution and pH must be adjusted to isotonic and substantially neutral values. These properties are readily measured by techniques well known to pharmacists. A convenient vehicle for providing an isotonic solution is either a 5% glucose solution or 0.9% sodium chloride solution. In some instances, the active ingredients and accompanying solubilizers and buffers are themselves adequate to provide an isotonic solution. Finally, the spermocompatibility of the solution must be determined. This can be established by techniques well known to inseminators and to members of the veterinary profession. In its simplest form it involves simply mixing a sample of motile sperm with the solution and observing the motility of the sperm under the microscope. The motility of the sperm should persist for several hours following mixture with the solution although it is not ordinarily necessary for motility to persist as long as 24 hours.

An adequate concentration of the antimicrobial agent in the solution is a somewhat more difficult factor to evaluate in vitro since the identity of the etiological agent is not ordinarily known. The preferred approach is to simply use the highest level feasible. The feasibility is determined by the solubility of the agent and its effect on the uterine tissues. It is, of course, essential to avoid concentrations which are irritating to the tissue. Ordinarily, relatively low concentrations are satisfactory. For instance, in the tetracycline series, concentrations of 10 mg./ml. have been found to give entirely satisfactory results. In general, a concentration of from about 2 to about 20 mg./ml. of the antibiotic(s) as the pure basic material (rather than calculated as a salt or complex) is useful.

A preferred embodiment of the present invention is carried out in connection with bovine artificial insemination. The semen is deposited with routine equipment as high as possible in the uterine cavity. The same inseminaiton cannula is then withdrawn a few inches, the semen cartridge detached, and replaced with a 10 ml. syringe containing the douche solution, preferably a calcium-oxytetracycline-glucose complex as described in Example I hereinafter. The solution is then deposited in the cervical region of the uterus. No effort being made to distribute the medication, as it has been shown that shortly after administration the antibiotic is uniformly well distributed within the uterine body.

With horses artificial insemination is not generally employed. One method that has proven satisfactory in this instance is to have the operator observe the horses and to apply the solution in the above indicated fashion immediately following the completion of breeding. An alternative method that has also met with success involves introduction of the solution prior to exposing the mare and studhorse to one another.

The following examples are provided to illustrate specific embodiments of the present invention. They are, however, not to be considered as limiting the scope thereof which is set forth in the appended claims.

Example I

A composition is prepared by dissolving in sufficient water to provide 2 liters of solution oxytetracycline hydrochloride, 50 g., calcium hydroxide 7.4 g., and glucose 19.8 g. Parenteral grade material are employed. The solution is filtered through a bacteriological filter to provide a sterile fiber-free solution which is frozen and dried from the frozen state. The finely divided dry residue is then subdivided into vial containing 100 mg. of oxytetracycline activity per vial.

For administration in bovine artificial insemination the contents of a single vial are dissolved in 8 to 10 ml. of sterile distilled water and deposited in the cervical region of the uterus via the insemination cannula immediately following deposition of the semen high in the uterus. This is readily accomplished by simply detaching the empty semen syringe from the cannula and inserting a syringe containing the above solution.

For use with animals where natural insemination is depended upon such as horses, the solution is deposited in a similar fashion either immediately prior to or after exposure of the mare to the studhorse.

Example II

A solution of tetracycline aluminum gluconate (1:2:6) (U.S. 2,736,725) suitable for use as described in Example I is prepared as follows. Amphoteric tetracycline, 4.8 g., is dissolved in 37.7 ml. of an aluminum gluconate solution which is prepared by dissolving 16.3 g. of aluminum isoproxide and 42.6 g. of glucono-delta-lactone in 125 ml. of water, stirring in an ice bath for one hour, storing at room temperature for 24 hours, and diluting to 150 ml. After dissolving the tetracycline, the solution is allowed to stand at room temperature for one hour and the pH is adjusted to 7.0 with 20% sodium hydroxide solution. This solution is then diluted to 500 ml. with aqueous sodium chloride having a concentration of 8.7 mg./ml. The solution is then frozen and dried from the frozen state. The batch is then subdivided placing 467 mg. of dry composition into each of a number of vials of appropriate size. The contents of a single vial are then suitable for use as described in Example I when dissolved in 10 ml. of sterile distilled water.

*Example III*

A chlortetracycline aluminum gluconate complex (1:1:3) is prepared as described in Example I of U.S. 2,736,725. Two hundred and twenty-seven milligrams of this complex is then dissolved in approximately 5 ml. of sodium chloride solution containing 8.7 mg./ml. of sodium chloride and the pH adjusted to within the range of 6.3 to 6.8. The resulting solution is diluted to 10 ml. with a further portion of the sodium chloride solution. This solution is then suitable for use as described in Example I.

*Example IV*

An aqueous solution of sodium benzyl penicillin having a concentration of 9 mg./ml. is satisfactory for use as an adjunct to insemination as described in Example I. The recommended 10 ml. dose of such a solution for cows contains approximately 150,000 units of penicillin.

*Example V*

Four cows with a previous history of being repeat breeders were obtained for this test. Eight unsuccessful attempts to inseminate them had been carried out for a breeding record of 8/4, 2.0, 0%. On the third attempt to inseminate these animals they were treated with the calcium-oxytetracycline-glucose complex as described in Example I. Three of the animals conceived as shown by subsequent examination of the animals and the fourth conceived after a repeat call. The breeding record for the animals when treated in this fashion was thus improved to 5/4, 1.25, 100% which is considered by inseminators to be highly satisfactory.

*Example VI*

Eight cows with an unsatisfactory breeding record of 16/8, 2.0, 0% were divided into two groups. Four were inseminated in the usual fashion without the use of an antimicrobial solution and four were inseminated and contemporaneously treated with the calcium-oxytetracycline-glucose solution as described in Example I. All four of the treated animals conceived with the satisfactory breeding record 6/4, 1.5, 100%. Only one of the four untreated animals conceived, their breeding record remaining unsatisfactory 13/4, 3.25, 25%.

*Example VII*

A group of 94 repeat breeder problem cows having had an average of 3.5 services per cow prior to treatment were treated as described in Example I employing a calcium-oxytetracycline-glucose solution at the moment of insemination. After the first service employing the above treatment, 66% of these animals were found to be pregnant. Many of the remaining animals conceived on the second service employing the above treatment without any further medication between estrual cycles.

*Example VIII*

An aqueous solution of 8 mg./ml. of sodium benzyl penicillin and 5 mg./ml. of dihydrostreptomycin sulfate is buffered at pH 6.5 with sodium citrate and adjusted to isotonicity with glucose. This is a satisfactory antibiotic formulation for use in the process of the present invention.

*Example IX*

An aqueous composition is prepared as in Example VIII using 5 mg./ml. of bacitracin, 5 mg./ml. of polymyxin B sulfate, and 5 mg./ml. of oleandomycin phosphate. The pH was adjusted and stabilized with a phosphate buffer.

What is claimed is:

1. A process for inseminating an animal which comprises introducing into the uterus of an ovum-bearing animal (1) a substantially neutral, substantially isotonic, spermocompatible antibiotic-containing solution having a volume from about 2 ml. to about 15 ml., said volume being adjusted on the basis of the approximate weight of the uterus and being just sufficient to wet the endometrium of said uterus; and (2) motile sperm, so that (1) and (2) are present in the uterus at the same time and are brought into contact with each other approximately at the time of introduction into the uterus; said antibiotic-containing solution having from about 2 mg. to about 20 mg. of antibiotic per ml. of solution.

2. A process as claimed in claim 1 wherein the antibiotic activity of said solution is due to the presence therein of an antibiotic selected from the group consisting of tetracycline, chlortetracycline, oxytetracycline and penicillin.

3. A process as claimed in claim 1 wherein the antibiotic activity of said solution is due to the presence therein of tetracycline aluminum gluconate.

4. A process as claimed in claim 1 wherein the antibiotic activity of said solution is due to the presence therein of chlortetracycline aluminum gluconate.

5. A process as claimed in claim 1 wherein the antibiotic activity of said solution is due to the presence therein of one molecular proportion of an oxytetracycline antibiotic acid addition salt, one molecular proportion of calcium hydroxide, and at least one molecular proportion of a carbohydrate selected from the group consisting of glucose, fructose, maltose, mannose, sorbose, and lactose.

6. A process as claimed in claim 1 wherein the antibiotic activity of said solution is due to the presence therein of sodium benzyl penicillin.

7. In the breeding of horses, the improvement which comprises introducing into the uterus of an ovum-bearing mare (1) a substantially neutral, substantially isotonic, spermocompatible antibiotic-containing solution having a volume of about 10 ml., and (2) motile sperm, so that (1) and (2) are present in the uterus at the same time and are brought into contact with each other approximately at the time of introduction into the uterus; said solution having from about 2 mg. to about 20 mg. antibiotic per ml. of solution.

8. In the breeding of cows, the improvement which comprises introducing into the uterus of an ovum-bearing cow (1) a substantially neutral, substantially isotonic, spermocompatible antibiotic-containing solution having a volume of about 10 ml., and (2) motile sperm, so that (1) and (2) are present in the uterus at the same time and are brought into contact with each other approximately at the time of introduction into the uterus; said solution having from about 2 mg. to about 20 mg. antibiotic per ml. of solution.

References Cited in the file of this patent

UNITED STATES PATENTS

| | | |
|---|---|---|
| 1,559,978 | Page | Nov. 3, 1925 |
| 2,510,249 | Penksa | June 9, 1950 |
| 2,736,725 | Ritter | Feb. 28, 1956 |

OTHER REFERENCES

Waksman: Streptomycin, Nature and Practical Applications, Williams and Wilkins Co., © 1949, pp. 599–606. (Copy in Div. 43.)

Tosic et al.: Journal of Biochemistry, vol. 47, No. 2, August 1950, pp. 199–212.